United States Patent
Freymann et al.

(10) Patent No.: US 8,931,545 B2
(45) Date of Patent: Jan. 13, 2015

(54) INTERNAL COMBUSTION ENGINE AND HEAT ENGINE WITH MULTIPLE HEAT EXCHANGERS

(75) Inventors: Raymond Freymann, Munich (DE); Wolfgang Strobl, Eichstaett (DE); Walter Huebner, Grasbrunn (DE); Andreas Obieglo, Greer (DE); Peter Doemeland, Gilching (DE); Norbert Kraus, Langwied-Achsheim (DE); Juergen Becker, Munich (DE); Michael Hoetger, Berlin (DE); Christian Goebel, Berlin (DE); Goeran Gensicke, Oranienbaum (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1230 days.

(21) Appl. No.: 12/406,486

(22) Filed: Mar. 18, 2009

(65) Prior Publication Data

US 2009/0229786 A1 Sep. 17, 2009

Related U.S. Application Data

(63) Continuation of application No. PCT/EP2007/007893, filed on Sep. 11, 2007.

(30) Foreign Application Priority Data

Sep. 19, 2006 (DE) .................. 10 2006 043 835

(51) Int. Cl.
| | |
|---|---|
| *B60H 3/00* | (2006.01) |
| *F01N 5/02* | (2006.01) |
| *F28F 27/02* | (2006.01) |
| *G05D 23/00* | (2006.01) |
| *F01N 3/02* | (2006.01) |
| *F02G 3/00* | (2006.01) |
| *F01K 23/10* | (2006.01) |
| *F01K 3/18* | (2006.01) |
| *F01K 23/06* | (2006.01) |
| *F02G 5/04* | (2006.01) |
| *F22B 1/18* | (2006.01) |

(52) U.S. Cl.
CPC . *F28F 27/02* (2013.01); *F01K 3/18* (2013.01); *F01K 23/065* (2013.01); *F02G 5/04* (2013.01); *F22B 1/1807* (2013.01); *F02G 2260/00* (2013.01); *Y02T 10/166* (2013.01)
USPC ............... 165/42; 165/51; 165/103; 165/297; 60/320; 60/616; 60/618

(58) Field of Classification Search
USPC .......... 165/42, 43, 53, 101, 103, 140, 51–52, 165/297; 60/525, 600, 618, 670
See application file for complete search history.

(56) References Cited

U.S. PATENT DOCUMENTS

| 3,692,096 | A | * | 9/1972 | Pettersson et al. ................ 165/7 |
|---|---|---|---|---|
| 5,000,003 | A | * | 3/1991 | Wicks ............................ 60/618 |
| 5,412,936 | A | * | 5/1995 | Lee et al. ........................ 60/801 |
| 2004/0045293 | A1 | * | 3/2004 | Freymann ....................... 60/670 |
| 2005/0229595 | A1 | * | 10/2005 | Hoetger et al. ................. 60/525 |

* cited by examiner

*Primary Examiner* — Allana Lewin
*Assistant Examiner* — Travis Ruby
(74) *Attorney, Agent, or Firm* — Crowell Moring LLP

(57) ABSTRACT

A heat exchanger arrangement is provided for an internal-combustion engine having a heat engine, which converts hot steam of a working medium by way of an expansion device to kinetic energy. The working medium, that can be delivered by a pump, can be heated in a first heat exchanger by a coolant and in a second heat exchanger by an exhaust gas of the internal-combustion engine. In the delivery direction, the working medium first flows through the first heat exchanger and, subsequently, through the second heat exchanger. The exhaust gas can flow through the first heat exchanger.

6 Claims, 5 Drawing Sheets

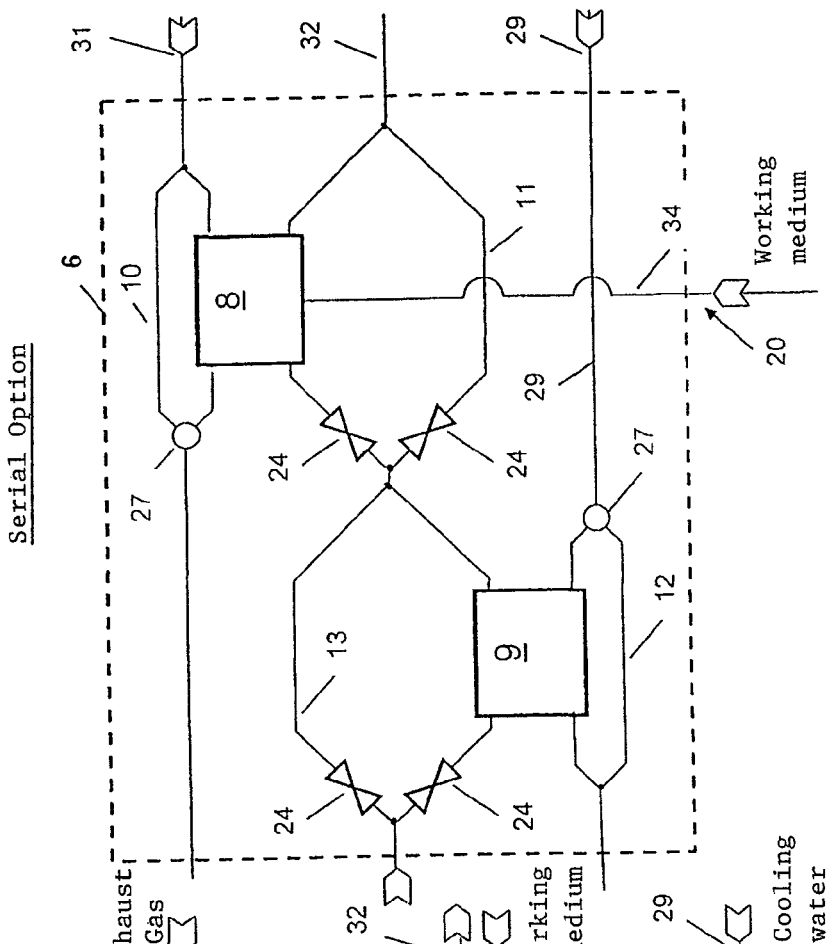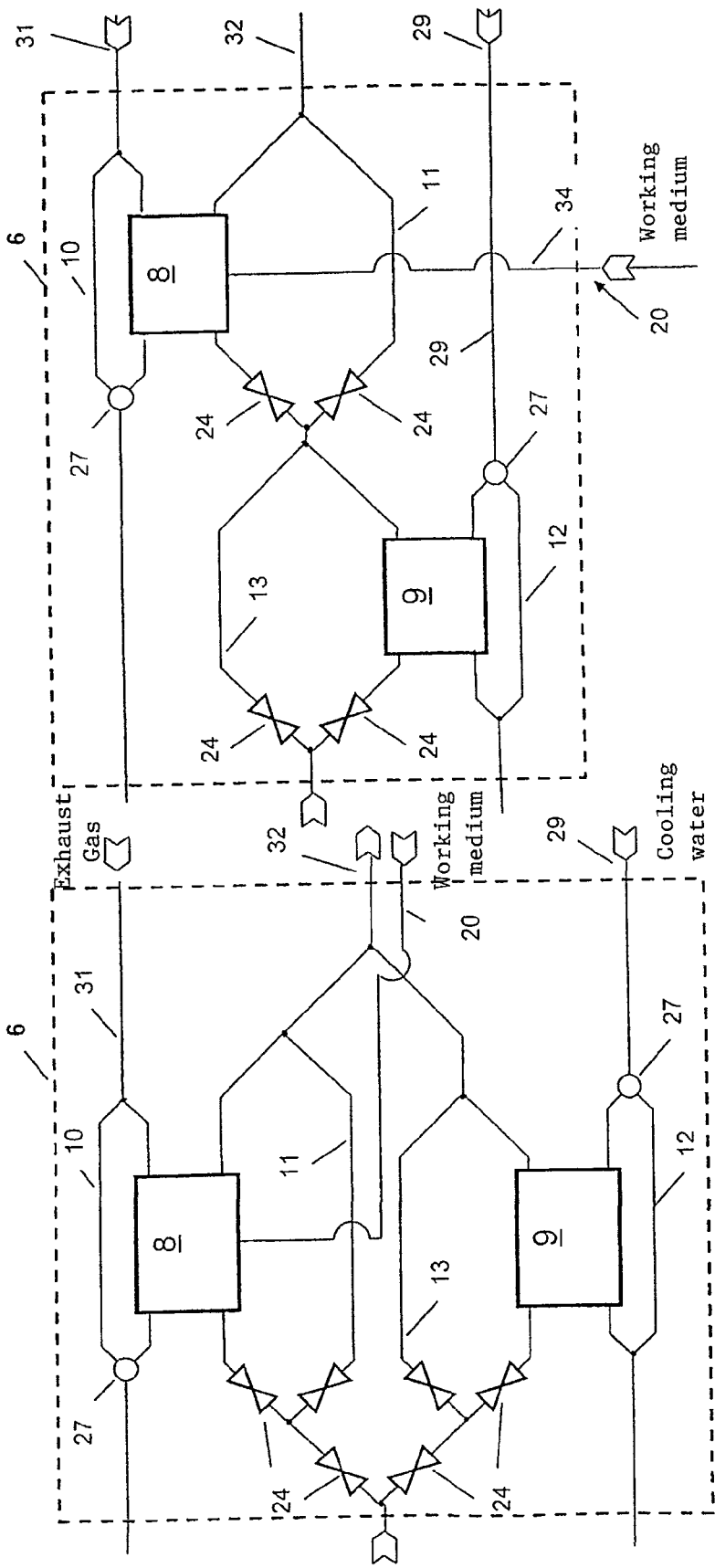

A1, A2, A3, ....

W2, W3, W4, ...

INTERNAL COMBUSTION ENGINE AND HEAT ENGINE WITH MULTIPLE HEAT EXCHANGERS

CROSS-REFERENCE TO RELATED APPLICATIONS

This application is a continuation of PCT International Application No. PCT/EP2007/007893, filed Sep. 11, 2007, which claims priority under 35 U.S.C. §119 to German Patent Application No. DE 10 2006 043 835.3, filed Sep. 19, 2006, the entire disclosures of which are herein expressly incorporated by reference.

BACKGROUND AND SUMMARY OF THE INVENTION

The invention relates to a heat exchanger arrangement for an internal-combustion engine.

This invention is based on Published European Patent Application EP 1 249 580 A1. In EP 1 249 580 A1, an internal-combustion engine is described which has a heat engine operating according to the Rankine process. The heat engine converts hot steam of a working medium by means of an expansion device to kinetic energy, which can be coupled into the output of the internal-combustion engine for reducing the fuel consumption and/or for increasing the power of the internal-combustion engine. For this purpose, the heat engine has a high-temperature circuit and a low temperature circuit. A heat exchanger is provided for the low-temperature circuit. By means of this heat exchanger the coolant of the internal-combustion engine is cooled and the thermal energy is transmitted to the working medium. A pump is provided for delivering the working medium. An additional pump arrangement is provided for the high-temperature circuit, which pump arrangement delivers the working medium through a further heat exchanger, which is arranged in the hot exhaust area of the internal-combustion engine. The thus produced hot steam from the low-temperature circuit and the high-temperature circuit is subsequently fed to an expansion device, which converts the kinetic energy of the hot steam to kinetic energy. Subsequently, the working medium is liquefied in a condenser and is returned to the low-temperature and the high-temperature circuit.

Even when the arrangement of the internal-combustion engine and the heat engine of the above-mentioned type have no specific disadvantage, the present invention improves the efficiency of the overall system.

According to the invention, a heat exchanger arrangement is provided for an internal-combustion engine having a heat engine which converts hot steam of a working machine, by way of an expansion device, to kinetic energy. The working medium, that can be delivered by a pump, is heatable in a first heat exchanger by a coolant and in a second heat exchanger by an exhaust gas of the internal-combustion engine. In the delivery direction, the working medium first flows through the first heat exchanger and, subsequently, through the second heat exchanger, wherein the exhaust gas can flow through the first heat exchanger.

As a result of the arrangement according to the invention, the heat transfer-from the coolant of the internal-combustion engine and the exhaust gas of the internal-combustion engine-to the working medium is clearly improved in comparison to the state of the art. This increases the efficiency of the overall arrangement.

A further improvement of the efficiency is achieved by the arrangement wherein in the first heat exchanger, a first heat transfer device is arranged for the exhaust gas and the working medium, and a second heat transfer device is arranged for the coolant and the working medium. The working medium can flow in parallel through the first and the second heat transfer device or the working medium can flow successively through the first and the second heat transfer device. In that regard, the working medium can first flow through the second and subsequently through the first heat transfer device.

In a preferred embodiment, bypasses are provided by which the thermal flow of the exhaust gas and the coolant into the working medium in the first heat exchanger can be optimally controlled or optimally automatically controlled.

In a further preferred embodiment, a third heat transfer device for the exhaust gas and the working medium is arranged in the second heat exchanger, and a fifth bypass for the working medium is provided in the second heat exchanger, wherein the thermal flow can be automatically controlled from the exhaust gas into the working medium in the second heat exchanger.

The efficiency of the heat engine is improved again in that a third heat exchanger is arranged in the flow direction of the working medium behind the second heat exchanger.

By arranging a fourth heat transfer device for the working medium and the exhaust gas in the third heat exchanger, and providing a sixth bypass for the fourth heat transfer device, the thermal flow can be adjusted particularly well from the exhaust gas and from the coolant into the working medium in the third heat exchanger.

In a further preferred embodiment, an injection device for the working medium is arranged in at least one of the heat transfer devices, in which case a very fast automatic temperature control can be achieved in the heat transfer devices.

In yet another preferred embodiment, an auxiliary heater for the working medium is provided in at least one heat exchanger, by which the working medium can be heated up rapidly.

In yet another preferred embodiment, at least one second second heat exchanger and/or one second third heat exchanger is provided in a flow direction of the working medium behind the second heat exchanger, in which case the efficiency of the heat exchanger arrangement is further improved.

In yet another embodiment, the second heat exchanger is an exhaust gas purification system, in which case a particularly compact and highly integrated design can be achieved.

In a further embodiment, the exhaust gas and/or the coolant can flow through the heat exchangers according to the counter-current principle with respect to the working medium, which also has a positive effect on the efficiency of the heat exchanger arrangement.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2a and 2b are schematic views of two embodiments of a first heat exchanger;

DETAILED DESCRIPTION OF THE DRAWINGS

In the following, the same reference numbers apply to identical components in FIGS. 1 to 5. In all figures, the flow directions of the coolant, the exhaust gas and the working medium through the components are illustrated by arrows.

Figure 1:
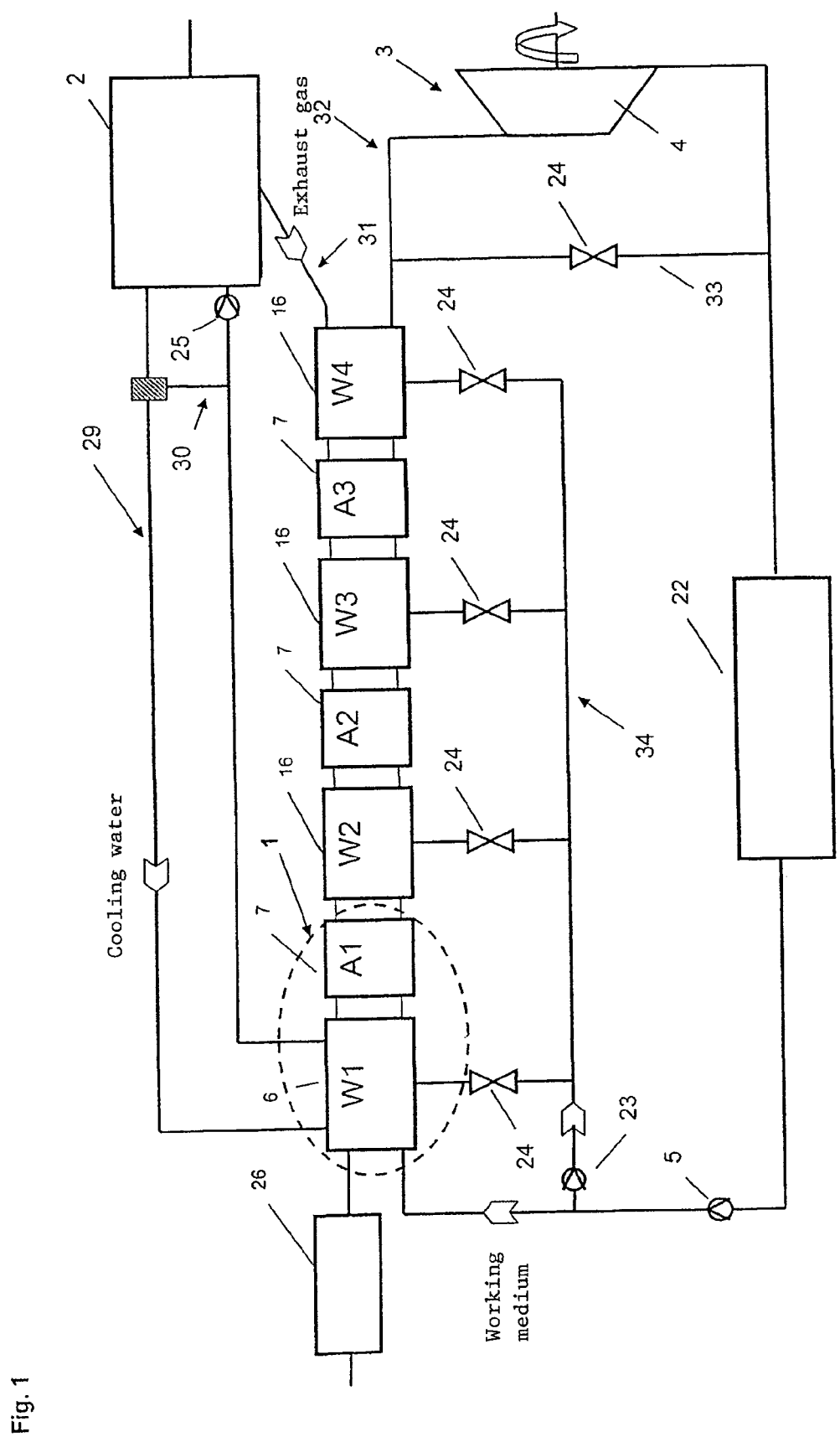
FIG. 1 is a schematic view of a heat exchanger arrangement according to the invention for an internal-combustion engine with a heat engine.

FIG. 1 is a schematic view of a heat exchanger arrangement 1 in a particularly preferred embodiment for an internal-combustion engine 2 with a heat engine 3. The internal-combustion engine 2 has a coolant circuit 29 for the removal of excess thermal energy during the operation of the internal-combustion engine 2. For this purpose, a coolant in the coolant circuit 29 is pumped by a coolant pump 25 hot out of the internal-combustion engine 2 and, for the cooling, is delivered through a first heat exchanger 6 and, in a cooled state, is delivered back into the internal-combustion engine 2. By way of a first short-circuit line 30, the first heat exchanger 6 can be bypassed for heating-up the internal-combustion engine by way of the coolant.

An exhaust gas of the internal-combustion engine 2 leaves the latter through an exhaust line 31 and flows through three (W4, W3, W2) third heat exchangers 16 and three (A3, A2, A1) second heat exchangers 7, then through the first heat exchanger 6 and a muffler 26.

A working medium in a working medium circuit 32 of the heat engine 3 delivered by a pump 5 flows through the first heat exchanger 6, the second heat exchangers 7 and the third heat exchangers 16 in the opposite direction of the exhaust gas and is heated by the hot exhaust gas and the hot coolant until hot steam is created. Subsequently, the gaseous working medium flows through an expansion device 4—a so-called expander—in which the thermal energy of the hot steam is converted to kinetic energy. A rotating direction of an output shaft, which is not shown, of the expansion device 4 is schematically outlined by an arrow. Subsequently, the cooled working medium flows through a condenser 22, in which the working medium is further cooled and liquefied. In an extreme case, the condenser 22 can also be used as a radiator for the coolant of the internal-combustion engine 2. The liquid working medium is subsequently forwarded by the pump 5 in the direction of the heat exchangers 6, 7, 16. In order to be able to automatically control the pressure in the expansion device 4, a throttling element 24 is arranged parallel to the expansion device 4 in a second short-circuit line 33. It thereby becomes possible to utilize this short-circuit line 33 as a bypass line in order to be able to guide a portion of or the entire steam mass flow past the expansion device 4, for example, when heating up the working medium.

Parallel to the heat exchangers 6, 7 and 16, a working medium injection circuit 34 is arranged, which has a second pump 23. By means of one throttling element 24 respectively, by way of the additional working medium injection circuit 34, the first heat exchanger 6 as well as the third heat exchangers 16 can be acted upon by working medium via the pump 23 additionally by way of injection devices (which are not shown in FIG. 1). An injection device 20 of this type is known from German Published Patent Application DE 100 54 022 A1 (having U.S. counterpart publication US 2004/0045293 A1). Concerning the method of operation of the injection device 20, reference is made directly to German Patent Document DE 100 54 022 A1 and the U.S. counterpart.

Furthermore, the first heat transfer device 8 has a third bypass 11, and the second heat transfer device 9 has a fourth bypass 13 for the working medium. In the flow direction of the working medium, throttling elements 24 are arranged in front of the first heat transfer device 8 and the second heat transfer device 9 at each forking of the working medium circuit 32, by which throttling devices 24 the flow rate of the working medium through the first heat transfer device 8 and the second heat transfer device 9 can, in each case, be controlled or automatically controlled.

When excessive thermal energy has already been withdrawn from the exhaust gas on its path to the first heat exchanger 6, in a further embodiment, the exhaust gas does not flow through the first heat exchanger 6; i.e., a flap partly or completely closes the exhaust line 31, and in this case, the exhaust gas is removed around the first heat exchanger in the direction of the muffler 26. In a further function, an overheating of the working medium can also prevented by use of the flap.

In a further embodiment, the generated mechanical energy can also be coupled-in directly onto the crankshaft of the internal-combustion engine or can be converted to electric current by way of a generator. An intermediate storage of the energy can take place using heat or steam accumulators or electrically in a battery or in capacitors, such as Supercaps.

A frost-resisting medium, such as water with an antifreezing compound, alcohol (or an alcohol mixture) or a refrigerating agent, such as R723, can be used as a working medium.

In FIG. 2, which is divided into FIGS. 2a and 2b, two variants of an interior construction of the first heat exchanger 6 are schematically illustrated.

FIG. 2a illustrates a parallel arrangement of a first heat transfer device 8 for the exhaust gas and the working medium and of a second heat transfer device 9 for the coolant and the working medium. The first heat transfer device 8 has a first bypass 10; the second heat transfer device 9 has a second bypass 12. In the flow direction of the exhaust gas, a flap 27 is arranged behind the first heat transfer device 8 between the bypass 10 and the exhaust line 31, by which flap 27 the exhaust gas flow rate through the heat transfer device 8 can be automatically controlled or controlled.

In the flow direction of the coolant, a flap 27 is arranged in front of the second heat transfer device 9 between the bypass 12 and the coolant circuit 29, by which flap 27 the coolant flow rate through the second heat transfer device 9 can be automatically controlled or controlled.

Furthermore, the first heat transfer device 8 has a second bypass 11, and the second heat transfer device 9 has a fourth bypass 13 for the working medium. In the flow direction of the working medium, throttling elements 24 are arranged in front of the first heat transfer device 8 and the second heat transfer device 9 at each forking of the working medium circuit 32, by which throttling devices 24 the flow rate of the working medium through the first heat transfer device 8 and the second heat transfer device 9 can, in each case, be controlled or automatically controlled.

Furthermore, the first heat transfer device 8 has the above-mentioned injection device 20 for the working medium, by which additional working medium for a rapid temperature control can be injected into the first heat transfer device 8.

In further embodiments, the flaps 27 may be arranged upstream and the throttling elements 24 may also be arranged downstream of the first and the second heat transfer device 8, 9.

FIG. 2b is a schematic view of a second constructional variant of the first heat exchanger 6. In this embodiment, the working medium flows successively through the heat transfer device 8, 9. In the preferred illustrated embodiment, the working medium first flows through the second heat transfer device 9 and, subsequently, flows through the first heat transfer device 8. With the exception of the alternative serial flow through the first and the second heat transfer device 8, 9, all explanations with respect to FIG. 2a also apply to FIG. 2b.

In another embodiment, the working medium first flows through the second heat exchanger and, subsequently, through the first heat exchanger (heat transfer device 8), which, however, results in a lower efficiency.

Figure 3:
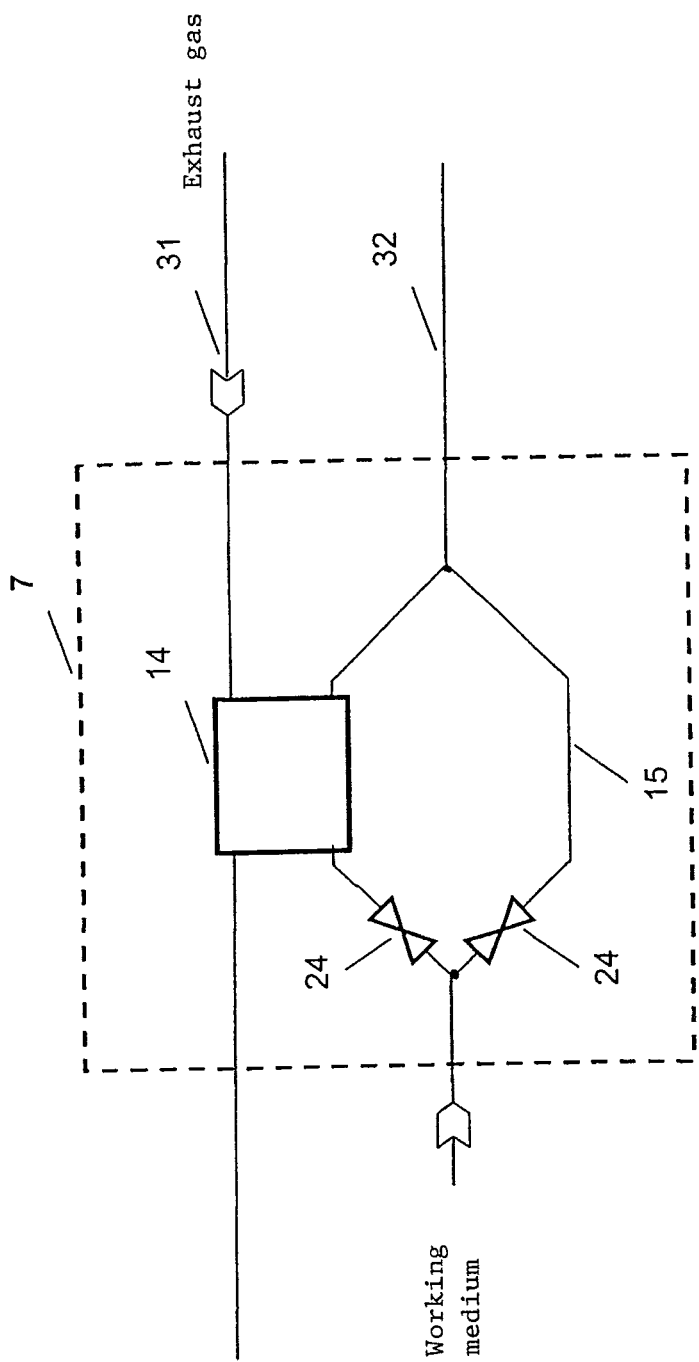
FIG. 3 is a schematic view of an embodiment of a second heat exchanger.

FIG. 3 is a schematic view of the interior construction of the second heat exchanger 7. As described with respect to FIG. 1, exhaust gas flows through the second heat exchanger 7, the exhaust gas in the interior of the second heat exchanger 7 flowing through a third heat transfer device 14. In addition, the working medium flows through the third heat transfer device 14, the third heat transfer device 14 having a fifth bypass 15 for the working medium. Throttling elements 24 are arranged in the flow direction of the working medium in front of the third heat transfer device 14 at a forking of the working medium circuit 32, by which throttling elements 24 the flow rate of the working medium through the third heat transfer device 14 can in each case by controlled or automatically controlled.

In a further embodiment, the throttling elements 24 may also be arranged downstream of the third heat transfer device 14.

The second heat exchanger 7 is preferably an exhaust gas purification system, such as an oxidizing catalyst, a three-way catalyst, a nitrogen oxide sink or a particle filter. Combinations thereof or other exhaust treatment systems are also contemplated.

Figure 4:
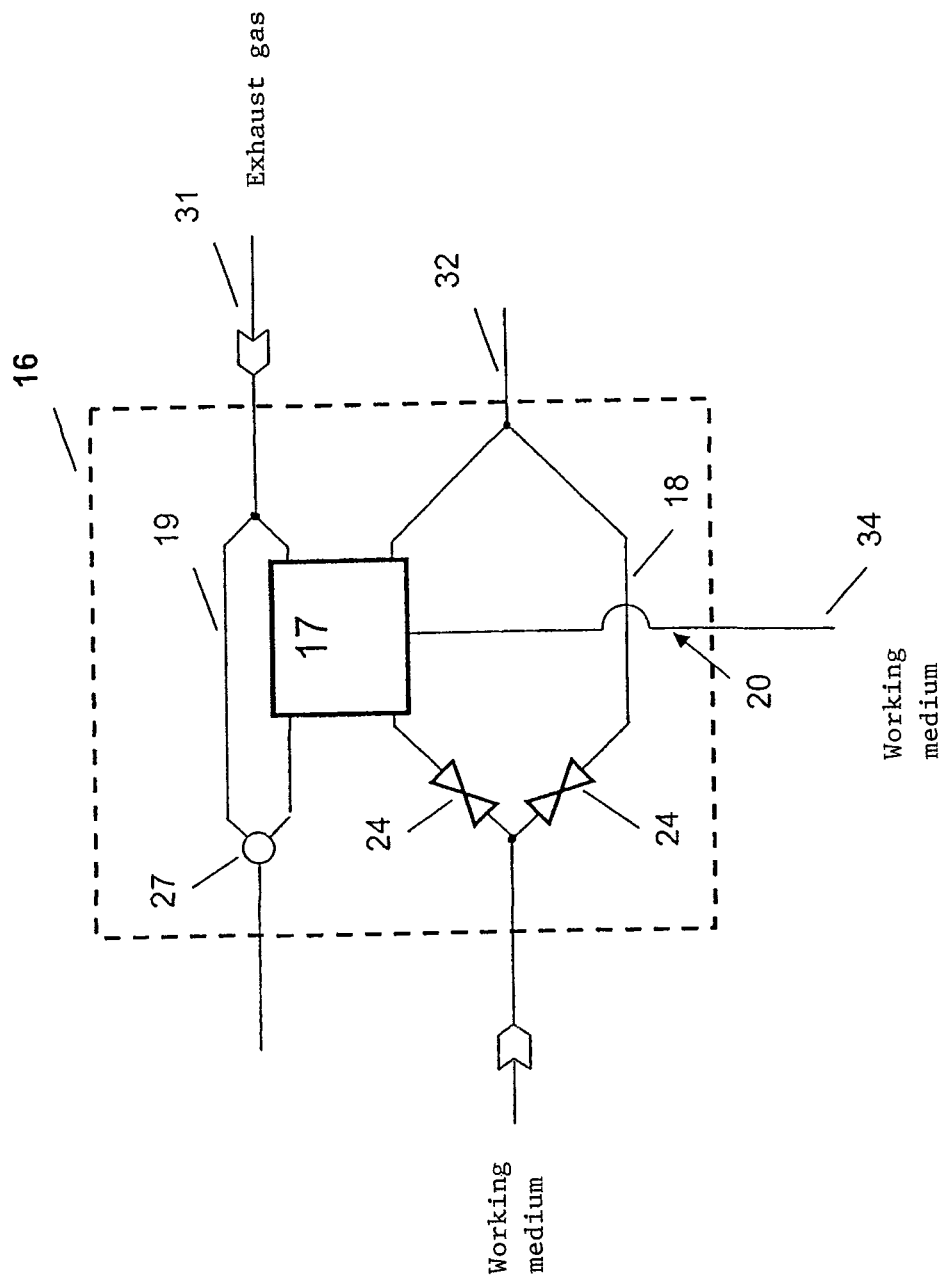
FIG. 4 is a schematic view of an embodiment of a third heat exchanger.

FIG. 4 is a schematic view of the interior construction of the third heat exchanger 16. As described above, the exhaust gas and the working medium also flow through the third heat exchanger 16. In the interior of the third heat exchanger 16, the exhaust gas flows through a fourth heat transfer device 17 having a seventh bypass 19 for the exhaust gas. The flow rate of exhaust gas through the fourth heat transfer device 17 can again be controlled or automatically controlled by use of a flap 27 which is arranged at a forking of the exhaust line 31 downstream of the fourth heat transfer device 17. On the one hand, this is used for maintaining a minimal temperature for the subsequent exhaust gas purification system, so that, for example, the catalyst function will not be impaired, and, on the other hand, for maintaining a maximal temperature, for example, for the protection of components. As a result, measures, such as the slight greasing of the internal-combustion engine 2 for protecting components, will no longer be necessary. The maintaining of the maximal temperature is additionally aided by the above-described injection device 20. As a result, a targeted optimal heat management becomes possible in the entire exhaust line 31.

Further, the working medium flows through the fourth heat transfer device 17, in which case a sixth bypass 18 is provided for the working medium. The flow rate of the working medium through the fourth heat transfer device 17 can again be controlled or automatically controlled by way of two throttling elements 24 at a forking of the working medium circuit 32 upstream of the fourth heat transfer device 17.

The fourth heat transfer device 17 also preferably has an above-described injection device 20. In further embodiments, the flap 27 may also be arranged upstream and the throttling elements 24 may be arranged downstream of the fourth heat transfer device 17.

Figure 5:
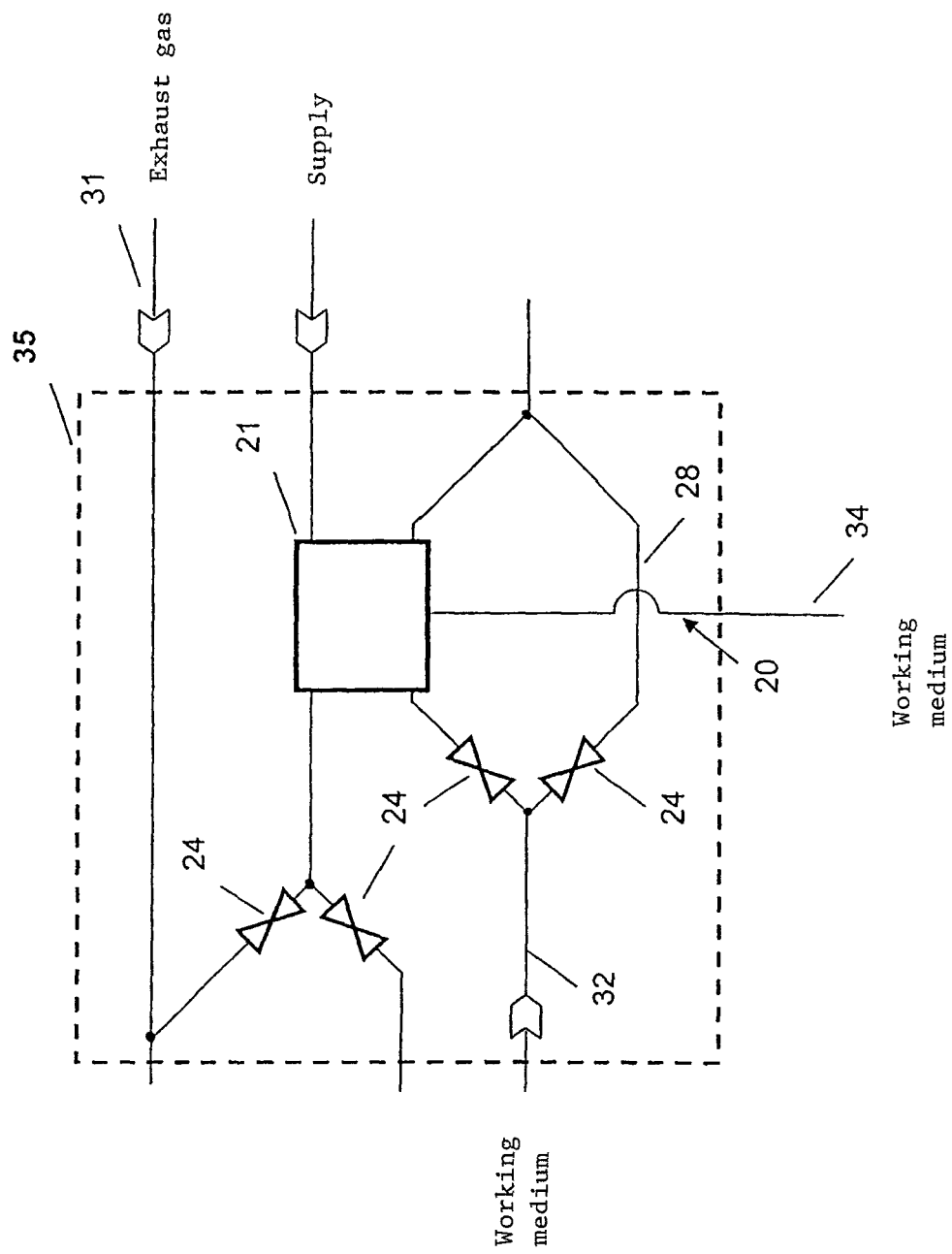
FIG. 5 is a schematic view of a heating device with an auxiliary heater.

FIG. 5 is a schematic view of an additional module, a heating device 35 of the heat exchanger arrangement 1 according to the invention, which is not shown in FIG. 1.

This heating device 35 has an auxiliary heater 21 for the working medium. The working medium can flow through the auxiliary heater 21 which has an eighth bypass 28. For adjusting the flow rate of the working medium (in a controllable or automatically controllable manner) by way of the auxiliary heater 21, two throttling elements 24 are provided upstream of the auxiliary heater 21 at a forking of the working medium circuit 32 and of the bypass 28.

In a further embodiment, the throttling elements 24 may also be arranged downstream of the auxiliary heater 21.

The auxiliary heater 21 can preferably be operated by use of fuel of the internal-combustion engine, so that the exhaust gases of the auxiliary heater 21 can be fed to the normal exhaust line 31. As an alternative, an electrical heating of the working medium or a heating by means of another fuel is also contemplated. Preferably, the heating device 35 is arranged as close as possible to the internal-combustion engine 2 and also has an injection device 20 for ensuring a very rapid temperature control.

In the present embodiments, the heat exchangers 6, 7, 16 can be operated according to the counter-current principle by use of coolant, exhaust gas and working medium. In further embodiments, the co-current principle or the cross-current principle can also be used.

Summarizing, the following significant advantages are obtainable for the heat exchanger arrangement 1 according to the invention for the internal-combustion engine 2 with the heat engine 3:

(1) the described embodiments provide a very high efficiency to the internal-combustion engine 2 and the heat engine 3 and thus also to the entire system;

(2) the dynamics of the heat engine 3 can be well controlled automatically by way of the control devices consisting of throttling elements (24) and flaps (27) by way of pumps 5, 23 as well as the injection device 20; and (3) the integration of the second heat exchanger 7 as well as of the third heat exchanger 16 into the exhaust treatment systems permits an extremely compact type of construction.

TABLE OF REFERENCE NUMBERS

1. Heat exchanger arrangement
2. Internal-combustion engine
3. Heat engine
4. Expansion device
5. Pump
6. First heat exchanger
7. Second heat exchanger
8. First heat transfer device
9. Second heat transfer device
10. First bypass
11. Second bypass
12. Third bypass
13. Fourth bypass
14. Third heat transfer device
15. Fifth bypass
16. Third heat exchanger
17. Fourth heat transfer device
18. Sixth bypass
19. Seventh bypass
20. Injection device
21. Auxiliary heater
22. Condenser
23. Second pump
24. Throttling element
25. Coolant pump
26. Muffler
27. Flap
28. Eighth bypass 29. Coolant circuit
30. First short-circuit line
31. Exhaust line
32. Working medium circuit
33. Second short-circuit line
34. Working medium injection circuit
35. Heating device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat exchanger for an internal-combustion engine, comprising:
   a heat engine which converts hot steam of a working medium to kinetic energy via an expansion device;
   a pump for delivering the working medium;
   a first heat exchanger operatively configured to heat the working medium via coolant and exhaust gas of the internal-combustion engine; and
   a second heat exchanger operatively configured to heat the working medium via the exhaust gas of the internal-combustion engine,
   a third heat exchanger operatively configured to heat the working medium via the exhaust gas of the internal-combustion engine,
   wherein
      in a delivery direction, the working medium first flows through the first heat exchanger and, subsequently, through the second heat exchanger,
      in a direction counter to the delivery direction, the exhaust gas is flowable first through the second heat exchanger and then through the first heat exchanger,
      the first heat exchanger comprises a first heat transfer device operatively configured for exchange of heat between the exhaust gas and the working medium provided to an inlet of the first heat transfer device, and a second heat transfer device operatively configured for exchange of heat between the coolant and the working medium,
      the first heat exchanger further comprises
         a working medium branch junction arranged to direct the working medium to at least one of the first heat transfer device and the second heat transfer device
         a first bypass provided for the exhaust gas and a second bypass provided for the working medium entering a first branch line toward the first heat transfer device, wherein when the first bypass is in a bypass position the exhaust gas is blocked from entering the first heat transfer device and when the second bypass is in a bypass position the working medium is blocked from entering the first heat transfer device,
         a first working medium injection device arranged to inject additional working medium into the first heat transfer device in addition to the working medium provided to the inlet of the first heat transfer device,
         a third bypass provided for the coolant and a fourth bypass provided for the working medium entering a second branch line toward the second heat transfer device, wherein when the third bypass is in a bypass position the coolant is blocked from entering the second heat transfer device and when the fourth bypass is in a bypass position the working medium is blocked from entering the second heat transfer device, and
      the second heat exchanger comprises
         a third heat transfer device operatively configured for exchange of heat between the working medium received from the first heat exchanger and exhaust gas, and
         a fifth bypass provided for the working medium to bypass the third heat transfer device, wherein when the fifth bypass is in a bypass position the working medium is blocked from entering the third heat transfer device,
      the third heat exchanger comprises
         a fourth heat transfer device through which the exhaust gas of the internal-combustion engine is flowable before flowing to the second heat exchanger and through which working fluid is received from the second heat exchanger,
         a sixth bypass provided for the working medium to bypass the fourth heat transfer device, and a seventh bypass provided for the exhaust gas to bypass the fourth heat transfer device, wherein when the seventh bypass is in a bypass position the exhaust gas is blocked from entering the fourth heat transfer device and when the sixth bypass is in a bypass position the working medium is blocked from entering the fourth heat transfer device,
         a second working medium injection device arranged to inject additional working medium into the fourth heat transfer device in addition to the working medium provided to the inlet of the fourth heat transfer device, and
      the second heat transfer device is a component of an exhaust gas purification system.

2. The heat exchanger according to claim 1, wherein the working medium flows in parallel through the first heat transfer device and the second heat transfer device.

3. The heat exchanger according to claim 1, wherein the working medium flows successively through one of the first and second heat transfer devices and then through the other of the first and second heat transfer devices.

4. The heat exchanger according to claim 3, wherein the working medium first flows through the second heat transfer device and then subsequently through the first heat transfer device.

5. The heat exchanger according to claim 1, further comprising an auxiliary heater for the working medium, the auxiliary heater being operatively arranged in at least one of the first and second heat exchangers.

6. The heat exchanger according to claim 1, further comprising at least one of an additional second heat exchanger and an additional third heat exchanger operatively arranged in the flow direction of the working medium behind the second heat exchanger.

* * * * *